United States Patent
Fragoso Rojas et al.

(10) Patent No.: US 11,443,455 B2
(45) Date of Patent: Sep. 13, 2022

(54) PRIOR INFORMED POSE AND SCALE ESTIMATION

(71) Applicant: Microsoft Technology Licensing, LLC, Redmond, WA (US)

(72) Inventors: Victor M. Fragoso Rojas, Bellevue, WA (US); Mei Chen, Bellevue, WA (US); Gabriel Takacs, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 16/744,068

(22) Filed: Jan. 15, 2020

(65) Prior Publication Data

US 2021/0125372 A1   Apr. 29, 2021

Related U.S. Application Data

(60) Provisional application No. 62/925,605, filed on Oct. 24, 2019.

(51) Int. Cl.
| | |
|---|---|
| *G06T 7/73* | (2017.01) |
| *H04N 5/247* | (2006.01) |
| *G06T 7/60* | (2017.01) |
| *G06T 7/80* | (2017.01) |

(52) U.S. Cl.
CPC ............ *G06T 7/75* (2017.01); *G06T 7/60* (2013.01); *G06T 7/80* (2017.01); *H04N 5/247* (2013.01); *G06T 2207/30244* (2013.01)

(58) Field of Classification Search
CPC ............ G06T 7/75; G06T 7/80; G06T 7/60
See application file for complete search history.

(56) References Cited

U.S. PATENT DOCUMENTS

| | | | | |
|---|---|---|---|---|
| 11,313,684 | B2 * | 4/2022 | Chiu | G01C 21/32 |
| 2013/0332065 | A1 * | 12/2013 | Hakim | G01S 5/0263 |
| | | | | 701/472 |
| 2015/0219767 | A1 * | 8/2015 | Humphreys | G01S 19/54 |
| | | | | 342/357.26 |
| 2016/0327653 | A1 * | 11/2016 | Humphreys | G01S 19/48 |

(Continued)

OTHER PUBLICATIONS

Arbabmir M, Ebrahimi M. Visual-inertial state estimation with camera and camera-IMU calibration. Robotics and Autonomous Systems. Oct. 1, 2019;120:103249. p. 1-9.*

(Continued)

*Primary Examiner* — Sarah Lhymn
(74) *Attorney, Agent, or Firm* — Alleman Hall Creasman & Tuttle LLP

(57) ABSTRACT

A scale and pose estimation method for a camera system is disclosed. Camera data for a scene acquired by the camera system is received. A rotation prior parameter characterizing a gravity direction is received. A scale prior parameter characterizing scale of the camera system is received. A cost of a cost function is calculated for a similarity transformation that is configured to encode a scale and pose of the camera system. The cost of the cost function is influenced by the rotation prior parameter and the scale prior parameter. A solved similarity transformation is determined upon calculating a cost for the cost function that is less than a threshold cost. An estimated scale and pose of the camera system is output based on the solved similarity transformation.

20 Claims, 5 Drawing Sheets

(56) References Cited

U.S. PATENT DOCUMENTS

| | | | |
|---|---|---|---|
| 2018/0018791 A1* | 1/2018 | Guoyi | G02B 27/0172 |
| 2018/0365853 A1* | 12/2018 | Yang | G06T 7/75 |
| 2019/0188474 A1* | 6/2019 | Zahnert | G02B 27/0172 |
| 2019/0347808 A1* | 11/2019 | Wong | G06T 7/248 |
| 2020/0082626 A1* | 3/2020 | Guo | G06F 3/011 |
| 2020/0105041 A1* | 4/2020 | Garofalo | G06T 13/40 |
| 2020/0117210 A1* | 4/2020 | Ren | G05D 1/0212 |
| 2020/0126284 A1* | 4/2020 | Garofalo | G16H 40/63 |
| 2021/0063200 A1* | 3/2021 | Kroepfl | G01C 21/3841 |
| 2021/0241480 A1* | 8/2021 | Kämäräinen | A61B 5/1079 |
| 2022/0101588 A1* | 3/2022 | Garofalo | G06F 3/011 |

OTHER PUBLICATIONS

Li C, Wang S, Zhuang Y, Yan F. Deep sensor fusion between 2D laser scanner and IMU for mobile robot localization. IEEE Sensors Journal. Apr. 12, 2019;21(6):8501-9.*

Qin T, Pan J, Cao S, Shen S. A general optimization-based framework for local odometry estimation with multiple sensors. arXiv preprint arXiv:1901.03638. Jan. 11, 2019.*

Bujnak, et al., "A General Solution to the P4P Problem for Camera with Unknown Focal Length", In Proceedings of IEEE Conference on Computer Vision and Pattern Recognition, Jun. 23, 2008, 8 Pages.

Camposeco, et al., "Hybrid Camera Pose Estimation", In Proceedings of IEEE Conference on Computer Vision and Pattern Recognition, Jun. 18, 2018, 9 Pages.

Degol, et al., "Improved Structure from Motion Using Fiducial Marker Matching", In Proceedings of the European Conference on Computer Vision, Oct. 7, 2018, pp. 1-16.

Engel, et al., "LSD-SLAM: Large-Scale Direct Monocular SLAM", In Proceedings of the European Conference on Computer Vision, Sep. 2014, 16 Pages.

Ferraz, et al., "Very Fast Solution to the PnP Problem with Algebraic Outlier Rejection", In Proceedings of IEEE Conference on Computer Vision and Pattern Recognition, Jun. 23, 2014, 8 Pages.

Fischler, et al., "Random Sample Consensus: A Paradigm for Model Fitting with Applications to Image Analysis and Automated Cartography", In Proceeding of communications of the ACM, vol. 24, No. 6, Jun. 1981, pp. 381-395.

Geiger, et al., "Vision Meets Robotics: The KITTI Dataset", In International Journal of Robotics Research, Sep. 2013, 6 Pages.

Geppert, et al., "Efficient 2D-3D Matching for Multi-Camera Visual Localization", In repository of arxiv; arXiv:1809.06445, Sep. 17, 2018, 7 Pages.

Hartley, et al., "Rotation Averaging", In International Journal of Computer Vision, vol. 101, Issue 2, Jan. 30, 2013, 41 Pages.

Heng, et al., "Project Autovision: Localization and 3d Scene Perception for an Autonomous Vehicle with a Multi-Camera System", In proceedings of IEEE International Conference on Robotics and Automation (ICRA), Sep. 14, 2018, 8 Pages.

Hesch, et al., "A Direct Least-Squares (DLS) Method for PnP", In Proceedings of IEEE International Conference on Computer Vision, Nov. 6, 2011, pp. 383-390.

Huynh, Du Q., "Metrics for 3D Rotations: Comparison and Analysis", In Journal of Mathematical Imaging and Vision, Jun. 18, 2009, pp. 155-164.

Jones, et al., "Visual-Inertial Navigation, Mapping and Localization: A Scalable Real-Time Causal Approach", In the International Journal of Robotics Research, Apr. 30, 2011, 38 Pages.

Klein, et al., "Parallel Tracking and Mapping on a Camera Phone", In Proceedings of the IEEE International Symposium on Mixed and Augmented Reality (ISMAR), Oct. 19, 2009, 4 Pages.

Kneip, et al., "A Novel Parametrization of the Perspective-Three-Point Problem for a Direct Computation of Absolute Camera Position and Orientation", In Proceedings of IEEE Conference Computer Vision and Pattern Recognition (CVPR), Jun. 20, 2011, 8 Pages.

Kneip, et al., "Robust Real-Time Visual Odometry with a Single Camera and an IMU", In Proceedings of the British Machine Vision Conference (BMVC), Aug. 29, 2011, 12 Pages.

Kneip, et al., "UPnP: An Optimal O(n) Solution to the Absolute Pose Problem with Universal Applicability", In Proceedings of the European Conference on Computer Vision, Sep. 6, 2014, pp. 127-142.

Kneip, et al., "Using Multi-Camera Systems in Robotics: Efficient Solutions to the NPnP Problem", In Proceedings of IEEE International Conference on Robotics and Automation, May 6, 2013, pp. 3770-3776.

Kukelova, et al., "Automatic Generator of Minimal Problem Solvers", In Proceedings of the European Conference on Computer Vision (ECCV), Oct. 12, 2008, 14 Pages.

Kukelova, et al., "Closed-Form Solutions to Minimal Absolute Pose Problems with Known Vertical Direction", In Proceedings of the Asian Conference on Computer Vision (ACCV), Nov. 2010, 14 Pages.

Kukelova, et al., "Efficient Intersection of Three Quadrics and Applications in Computer Vision", In Proceedings of the IEEE Conference on Computer Vision and Pattern Recognition (CVPR), Jun. 2016, pp. 1799-1808.

Kukelova, et al., "Real-Time Solution to the Absolute Pose Problem with Unknown Radial Distortion and Focal Length", In Proceedings of IEEE International Conference on Computer Vision (ICCV), Dec. 1, 2013, pp. 2816-2823.

Larsson, et al., "Beyond Grobner Bases: Basis Selection for Minimal Solvers", In Proceedings of IEEE Conference on Computer Vision and Pattern Recognition (CVPR), Mar. 12, 2018, 10 Pages.

Lee, et al., "Minimal Solutions for Pose Estimation of a Multi-Camera System", In Proceedings of 16th International Symposium, Apr. 23, 2016, pp. 521-538.

Lepetit, et al., "EPnP: An Accurate O(n) Solution to the PnP Problem", In International Journal of Computer Vision (IJCV), vol. 81, Issue 2, Jul. 19, 2008, 12 Pages.

Levinson, et al., "Map-Based Precision Vehicle Localization in Urban Environments", In Robotics: Science and Systems, Jun. 27, 2007, 8 Pages.

Ma, et al., "An Invitation to 3-D Vision: from Images to Geometric Models", In the Book of Springer Science & Business Media, vol. 26, Nov. 19, 2001, 338 Pages.

Martin, et al., "Mapping and Re-Localization for Mobile Augmented Reality", In Proceedings of IEEE International Conference on Image Processing (ICIP), May 22, 2014, 6 Pages.

Mur-Artal, et al., "ORB-SLAM2: An Open-Source Slam System for Monocular, Stereo, and RGB-D Cameras", In IEEE Transactions on Robotics, vol. 33, Issue 5, Oct. 5, 2017, pp. 1255-1262.

Nister, David, "A Minimal Solution to the Generalised 3-Point Pose Problem", In Journal of Mathematical Imaging and Vision, Jan. 1, 2007, 8 Pages.

Pless, Robert, "Using Many Cameras as One", In Proceedings of IEEE Computer Society Conference on Computer Vision and Pattern Recognition, Jun. 18, 2003, 7 Pages.

Sattler, et al., "Benchmarking 6DOF Outdoor Visual Localization in Changing Conditions", In Proceedings of the IEEE Conference on Computer Vision and Pattern Recognition (CVPR), 2018, pp. 8601-8610.

Schmalstieg, et al., "Augmented Reality: Principles and Practice", In Book of IEEE Virtual Reality (VR), Mar. 18, 2017, pp. 425-426.

Sturm, et al., "A Benchmark for the Evaluation of RGB-D Slam Systems", In Proceedings of the International Conference on Intelligent Robot Systems (IROS), Oct. 7, 2012, pp. 573-580.

Sweeney, et al., "Efficient Computation of Absolute Pose for Gravity-Aware Augmented Reality", In Proceedings of the IEEE International Symposium on Mixed and Augmented Reality, Sep. 29, 2015, pp. 19-24.

Sweeney, et al., "gDLS: A Scalable Solution to the Generalized Pose and Scale Problem", In Proceedings of Computer Vision—ECCV 2014, Sep. 6, 2014, pp. 16-31.

Sweeney, et al., "Large Scale SfM with the Distributed Camera Model", In Proceedings of the IEEE International Conference on 3D Vision (3DV), Jul. 13, 2016, 10 Pages.

(56) References Cited

OTHER PUBLICATIONS

Sweeney, et al., "Solving for Relative Pose with a Partially Known Rotation is a Quadratic Eigenvalue Problem", In Proceedings of the International Conference on 3D Vision, Dec. 8, 2014, pp. 483-490.
Sweeney, et al., "Theia: A Fast and Scalable Structure-from-Motion Library", In Proceedings of the ACM International Conference on Multimedia, Oct. 26, 2015, pp. 693-696.
Tsotsos, et al., "Robust Inference for Visual Inertial Sensor Fusion", In Proceedings of the International Conference on Robotics and Automation (ICRA), May 26, 2015, pp. 5203-5210.
Ventura, et al., "A Minimal Solution to the Generalized Pose-and-Scale Problem", In Proceedings of the IEEE Conference on Computer Vision and Pattern Recognition (CVPR), Jun. 23, 2014, pp. 422-429.
Ventura, et al., "Global Localization from Monocular Slam on a Mobile Phone", In Proceedings of IEEE Transactions on Visualization and Computer Graphics, vol. 20, Issue 4, Mar. 24, 2014, pp. 531-539.
Ventura, et al., "Wide-Area Scene Mapping for Mobile Visual Tracking", In Proceedings of the IEEE International Symposium on Mixed and Augmented Reality, Nov. 5, 2012, pp. 3-12.
Weiss, et al., "Monocular Vision for Long-Term Micro Aerial Vehicle State Estimation: A Compendium", In Journal of Field Robotics, vol. 30, Issue 5, Sep. 2013, pp. 803-831.
Wu, Changchang, "P3.5P: Pose Estimation with Unknown Focal Length", In Proceedings of IEEE Conference on Computer Vision and Pattern Recognition (CVPR), Jun. 7, 2015, pp. 2440-2448.
Zeisl, et al., "Camera Pose Voting for Large-scale Image-Based Localization", In Proceedings of IEEE International Conference on Computer Vision (ICCV), Dec. 7, 2015, pp. 2704-2712.
Zheng, et al., "Revisiting the PnP Problem: A Fast, General and Optimal Solution", In Proceedings of the IEEE International Conference on Computer Vision, Dec. 2013, pp. 2344-2351.
Ziegler, et al., "Video Based Localization for Bertha", In Proceedings of IEEE Intelligent Vehicles Symposium, Jun. 8, 2014, pp. 1231-1238.

\* cited by examiner

PRIOR INFORMED POSE AND SCALE ESTIMATION

CROSS REFERENCE TO RELATED APPLICATIONS

This application claims priority to U.S. Provisional Patent Application No. 62/925,605, filed Oct. 24, 2019, the entirety of which is hereby incorporated herein by reference.

BACKGROUND

Camera pose estimation, i.e., estimating the position and orientation of a camera system relative to a scene, is a central step in computer vision. For example, pose estimation may be utilized in computer vision applications, such as Simultaneous Localization and Mapping (SLAM), visual localization, augmented reality (AR), 3D mapping, and robotics. Such camera pose estimation may enable spatial registration between a camera coordinate system and a world coordinate system of the scene.

SUMMARY

A scale and pose estimation method for a camera system is disclosed. Camera data for a scene acquired by one or more cameras of the camera system is received. A rotation prior parameter characterizing a gravity direction is received. A scale prior parameter characterizing scale of the camera system is received. A cost of a cost function is calculated for a similarity transformation that is configured to encode a scale and pose of the camera system. The cost of the cost function is selectively influenced by the rotation prior parameter and the scale prior parameter. A solved similarity transformation is determined upon calculating a cost for the cost function that is less than a threshold cost. An estimated scale and pose of the camera system is output based on the solved similarity transformation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many real-world applications in computer vision such as augmented reality (AR), three-dimensional (3D) mapping, and robotics require both fast and accurate estimation of camera pose and scale. Achieving high speed and maintaining high accuracy when estimating pose and scale of a camera system are often conflicting goals. Some conventional approaches for estimating scale and pose of a camera system produce estimations at a high speed, however such estimations may have lower accuracy. Other conventional approaches for estimating scale and pose of a camera system produce estimations with high accuracy, however such estimations may be produced at lower speeds that may not be feasible for many applications.

The present description is directed to an approach for estimating scale and absolute pose of a camera system in a manner that achieves both high speed and high accuracy. In particular, this approach exploits a priori knowledge of the solution by using rotation and scale prior parameters to bias the solution to more quickly obtain accurate estimations. Use of such rotation and scale prior parameters may accelerate the estimation process and improve scale and pose estimation accuracy relative to other approaches that do not use scale and rotation prior parameters.

Furthermore, in some implementations, the estimation approaches described herein may be configured to operate with selective and/or varying influence of the scale and rotation prior parameters on scale/pose estimation. For example, the contribution of each prior parameter may be flexibly weighed based on noisy input data, for example as might occur due to sensor noise. As such, the estimation approach can be robust to noisy sensor inputs, which can arise in AR, robotics, and other applications.

Figure 1:
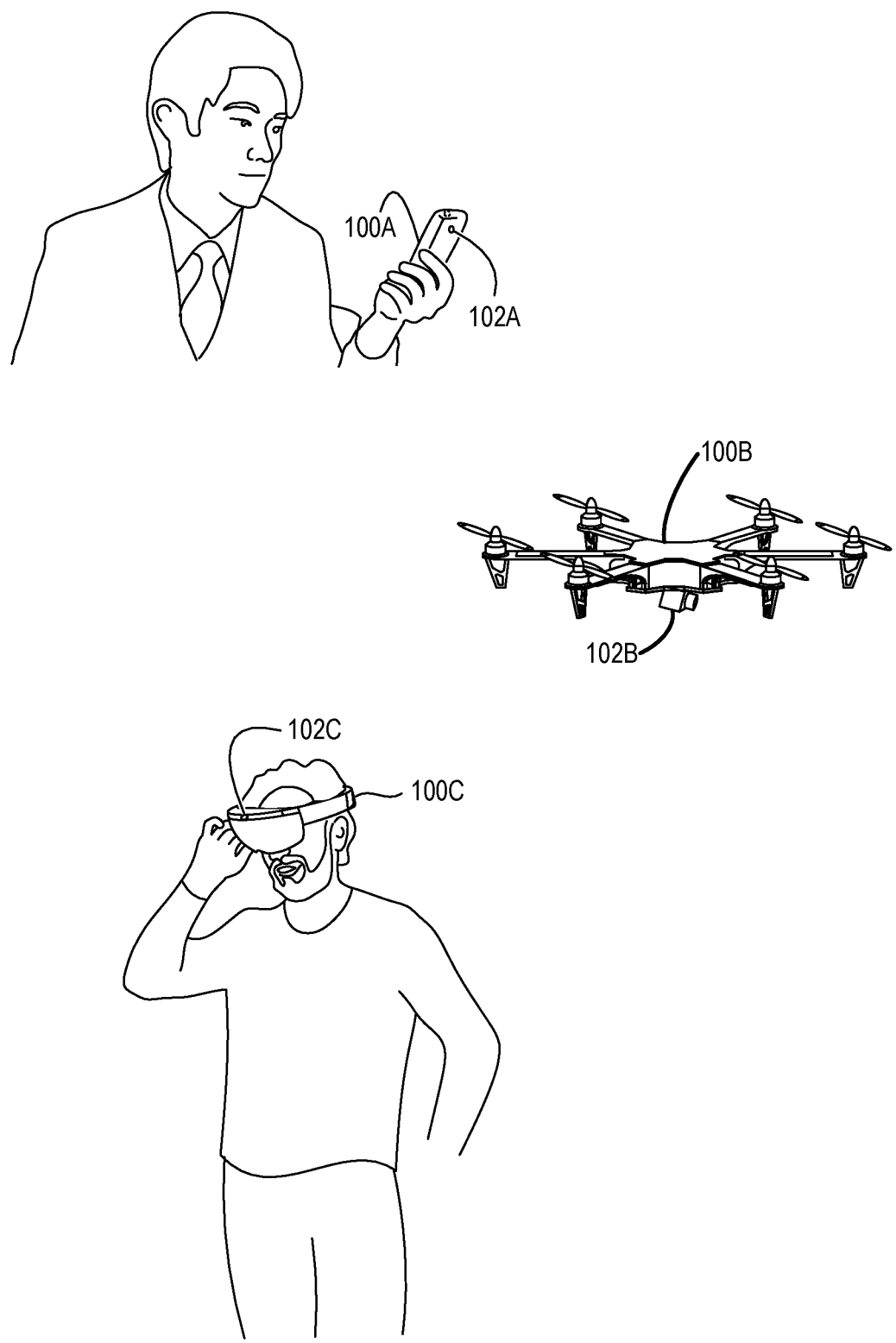
FIG. 1 shows different example electronic devices including camera systems used to spatially register the electronic devices with real-world environments.

FIG. 1 shows aspects of different examples of electronic devices (100A-C) that each have a camera system (102A-C) that may employ scale and pose estimation. Device 100A is a smartphone that includes a camera system 102A. For example, the camera system 102A may be used to present an augmented reality experience on a display of the smartphone. Device 100B is an automated flying vehicle that includes a camera system 102B. For example, the camera system 102B may be used to provide automated flight control of the automated flying vehicle. Device 100C is a virtual-reality or augmented-reality headset that includes a camera system 102C. For example, the camera system 102A may be used to present a virtual reality or augmented reality experience on a display of the headset. The example scale and pose estimation approaches disclosed herein may be applicable to these and other camera systems.

Figure 2:
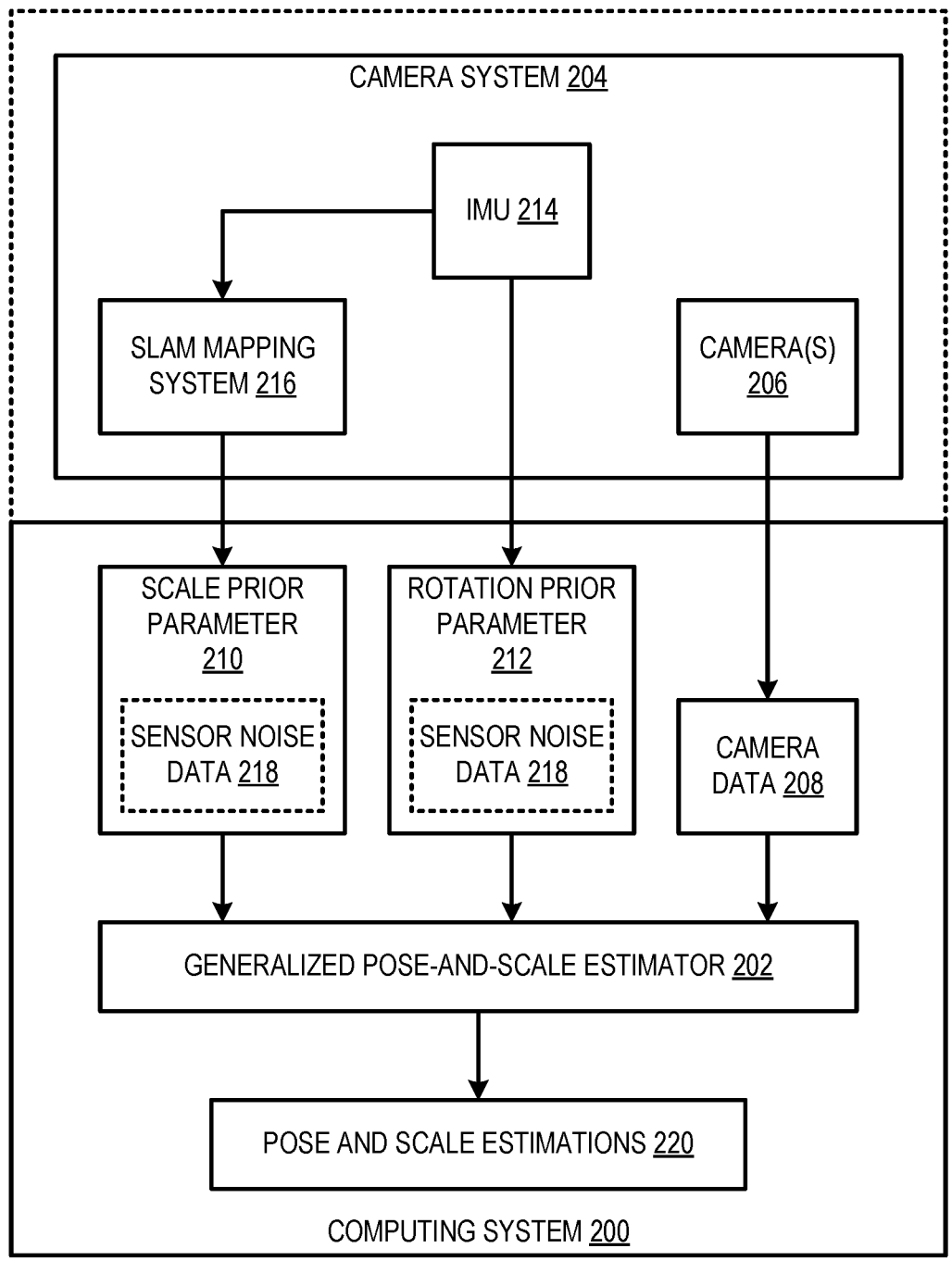
FIG. 2 shows an example pose and scale estimator implemented by a computing system.

FIG. 2 schematically shows an example computing system 200 configured to implement a generalized pose-and-scale estimator (or solver) 202. The estimator 202 may be implemented by the computing system as software, hardware, firmware, or any combination thereof. The estimator 202 may be configured to output pose and scale estimations for a camera system 204 including one or more cameras 206 based on camera data 208 received from the camera system 204. For example, the camera data 208 may include camera measurements of a collection of 3D points of a 3D model of a scene that are captured by one or more cameras of the camera system 204. In some examples, the estimator 202 may receive camera data in the form of an image or images from the camera system 204, and process the images to form a collection of 3D points of a 3D model of a scene. The estimator 202 may be configured to perform any suitable image processing operations to obtain camera data suitable for estimating scale and pose estimations of the camera system 204.

In some implementations, the camera system 204 may include a plurality of different cameras having different positions fixed relative to one another, and the camera data 208 may include data from each of the different cameras. Alternatively, in some implementations, the camera data 208 may include data from a single moving camera of the camera system 204 over time. The camera data 208 may include any suitable form of data derived from images captured by the camera(s) 206 of the camera system 204.

The estimator 202 further may be configured to receive a scale prior parameter 210 and a rotation prior parameter 212 as input. The scale prior parameter 210 characterizes scale of the camera system. The rotation prior parameter 212 characterizes a gravity direction. The scale prior parameter 210 and the rotation prior parameter 212 may inform the estimator 202 of behavior of the camera system 204 that may influence current estimations of scale and pose output by the estimator 202. These prior parameters may be derived from sensor data of the camera system 204. For example, the rotation prior parameter 212 can be derived from a gravity direction using measurements from one or more inertial sensors of an inertial measurement unit (IMU) 214. The IMU 214 may include one or more accelerometers, gyroscopes, and/or other motion sensors that are configured to provide an indication of gravity direction. Additionally, as an example, the scale prior parameter 210 can be obtained from a simultaneous localization and mapping (SLAM) system 216 of the camera system 204. The SLAM system 216 may be configured to keep a unit scale utilizing data from the IMU 214. The scale prior parameter 210 and the rotation prior parameter 212 may be provided from any suitable sensor of the camera system 204. In some examples, the scale prior parameter 210 and the rotation prior parameter 212 may be received by the estimator 202 prior to corresponding camera data 208, such that the scale prior parameter 210 and the rotation prior parameter 212 provide hints or suggestions of pose and orientation information for the camera system 204. In other examples, the scale prior parameter 210 and the rotation prior parameter 212 may be received by the estimator 202 substantially at the same time as the corresponding camera data 208. In yet other examples, the scale prior parameter 210 and the rotation prior parameter 212 may be received by the estimator 202 after the corresponding camera data 208 has been received by the estimator 202.

In some implementations, sensor noise data 218 optionally may be factored into the scale prior parameter 210 and/or the rotation prior parameter 212. The sensor noise data 218 may provide a quantifiable indication of sensor noise in operation of the IMU 214. In some examples, sensor noise data may correspond to operation of the IMU when the scale prior parameter 210 and the rotation prior parameter 212 are determined. In other words, the sensor noise data 218 may provide an indication of the reliability or accuracy of the scale prior parameter 210 and the rotation prior parameter 212 to the estimator 202.

The estimator 202 is configured to use the input data (e.g., camera data, scale and rotation prior parameters) to solve an optimization problem to estimate a probable pose/scale of the camera system 204. In one example, the estimator 202 is configured to calculate a cost of a cost function for a similarity transformation that is configured to encode a scale and pose of the camera system 204.

Figure 3:
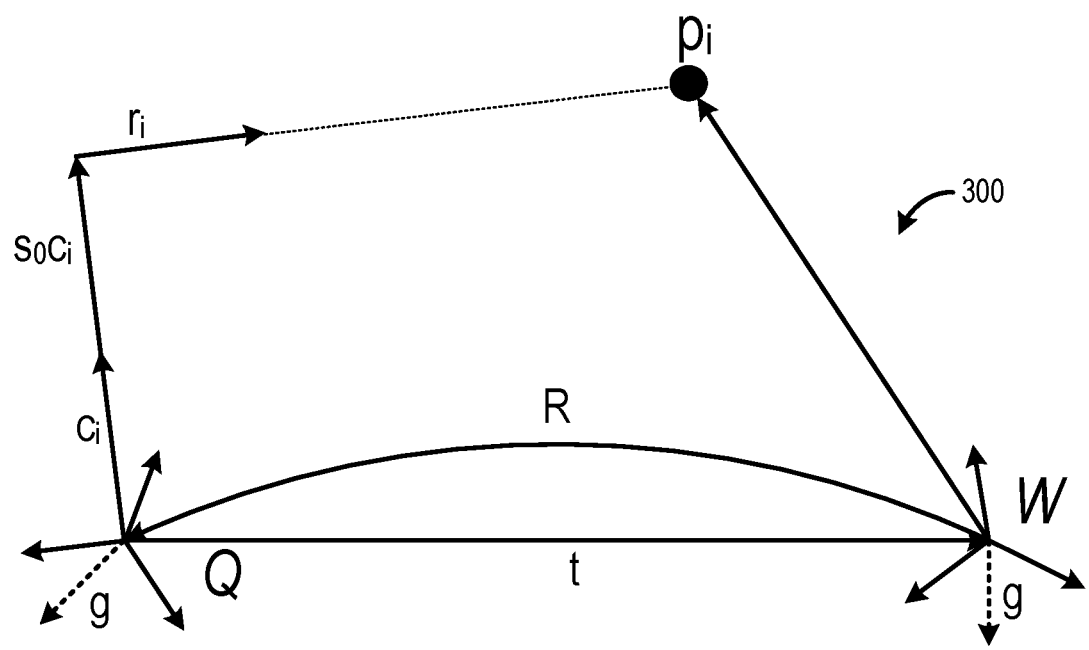
FIG. 3 diagrammatically shows an example transformation of a world coordinate system to a camera coordinate system.

FIG. 3 diagrammatically shows an example similarity transformation 300 for which the estimator 202 shown in FIG. 2 may be configured to solve. The similarity transformation may align a world coordinate system (W) and a camera coordinate system (Q) by estimating a rotation (R), translation (t), and scale(s) of the coordinate systems relative to one another. The inputs to the estimator include 1) camera data, for example a set of three dimensional points ($p_i$) in the world coordinate system, 2) a set of camera positions (positioned at the end of the ray $s_0 c_i$) in the multi-camera coordinate system, and 3) the gravity vectors (g) in the world coordinate system and the multi-camera coordinate system. In this example, the scale prior ($s_0$) influences the length of the ray to properly locate the camera positions (ray length for proper positioning and adjusted scale=$s_0 c_i$). The non-adjusted camera position(s) are denoted by ray ($c_i$). The ray ($r_i$) extends from the point of the camera position in the direction of the point ($p_i$).

Returning to FIG. 2, the estimator 202 may be configured to solve the similarity transformation by calculating a cost of a cost function for the similarity transformation. For example, the cost function may include a generalized least squares cost function. The cost function used by the estimator 202 may be a modification of a generalized least squares cost function shown as Equation (1) shown below. Equation (1) is a generalized least-squares cost function that may be used to estimate pose and scale of a non-central camera. Equation (1) may be used to solve for the rotation (R), the translation (t), and the scale (s) that minimizes the error/cost. Equation (1) does not include rotation and scale priors $$J(R,t,s,\alpha)=\Sigma_{i=1}^{n}\|\alpha_i r_i - (Rp_i + t - sc_i)\|^2. \quad (1)$$

where $r_i$ is a unit-vector indicating the direction from the position of the camera $c_i$ to a 3D point $p_i$; $\alpha_i$ is the depth of the point $p_i$ with respect to the camera position $c_i$; $\alpha$ is a vector holding the depths; $R \in SO(3)$ is a rotation matrix; $t \in R^3$ is a translation vector; and $s \in R$ is the scale. The pose-and-scale formulation shown in Eq. (1) accumulates the errors between the transformed i-th 3D point ($Rp_i + t - sc_i$) and the same point described with respect to the camera $\alpha_i r_i$. The rotation R, the translation t, and the scaled camera position $sc_i$ transform a 3D point from a world coordinate system to the coordinate system of the generalized camera.

In order to find the minimizer ($R^*$; $t^*$; $s^*$;$\alpha^*$), Equation 1 is rewritten as a function that only depends on the rotation matrix. In this step, the translation t, scale s, and depth $\alpha_i$ can be written as a linear function of the rotation matrix R. Thus, it is possible to re-write the pose-and-scale least-squares cost formulation of Equation (1) as Equation (2) shown below:

$$J(R)=\Sigma_{i=1}^{n}\|(R)r_i - (Rp_i t(R) - s(R)c_i)\|^2 = vec(R)^T M vec(R), \quad (2)$$

where $vec(R)$ is a vectorized form of the rotation matrix, and M is a squared matrix capturing the constraints from the input 2D-3D correspondences; the dimensions of M depend on the vectorization and representation of $vec(R)$. Given the cost function $J(R)$, the optimal rotation $R^*$ is found by solving a polynomial system representing the constraint that the gradient $\nabla_q J(R^*)=0$ is null with respect to the rotation-quaternion parameters q, and rotation-parameter constraints (e.g., ensuring a unit-norm quaternion).

Note that although the cost function is discussed herein in terms of solving for the minimizer, the cost function in some examples may be solved such that the cost is below a designated threshold cost.

In order to impose scale and rotation priors that influence the cost equation, Equation (1), is modified to include regularizer terms. Adding these regularizer terms leads to the least-squares cost function of Equation (3) shown below:

$$J'=J(R,t,s,\alpha)+\lambda_s(s_0 s)^2+\lambda_g\|g_Q \times Rg_W\|^2 \quad (3)$$

where $s_0$ is the scale prior; $g_Q$ and $g_W$ are the gravity directions of the multi-camera setting and world, respectively; the symbol×represents the cross-product operator; and $\lambda_s$ and $\lambda_g$ are weights controlling the contribution of the scale and rotation priors, respectively. These weights (i.e., $\lambda_s$ and $\lambda_g$) may be greater than or equal to zero.

These priors bias the cost function to penalize scale and rotation estimates that deviate from prior estimates. In particular, the scale prior regularizer term is an additional parameter that penalizes deviation from a prior assumption about scale. The scale is the reduction or enlargement factor that the points described in the camera coordinate system need to match the metric units of those points described in the world coordinate system. The scale prior regularizer term $\lambda_s(s_0-s)^2$ is configured to influence the cost by imposing a penalty on the cost when the queried scale s deviates from the scale prior $s_0$. On the other hand, the rotation prior is an additional parameter that captures a notion of difference between a candidate solution and a prior assumption about gravity direction. The rotation prior regularizer term $\lambda_g \|_Q \times Rg_W\|^2$ is configured to influence the cost by imposing a misalignment penalty on the cost when the transformed world gravity direction $Rg_W$ and the query gravity direction $g_Q$ are misaligned.

In some implementations, the estimator 202 may be configured to control the influence of the scale prior parameter and the rotation prior parameter on the cost function that determines the pose and scale estimations. In one example, each prior may have a corresponding scalar or trust weight (i.e., $\lambda_s$ and $\lambda_g$) that may be set based on sensor noise data 218 of the IMU sensor 214 from which the prior was obtained. In some implementations, the weights may be predetermined based on empirical sensor data. In other implementations, the weights may be dynamically adjusted based on the sensor noise data 218. For example, as sensor noise dynamically increases, the weight dynamically decreases such that the corresponding prior parameter has less (or no) influence on the cost of the cost function and further the estimations 220. Likewise, as sensor noise dynamically decreases, the weight dynamically increases such that the corresponding prior parameter has greater influence on the cost of the cost function and further the estimations 220.

In order to solve for rotation/pose and scale, the cost J' may be re-written as a function that only depends on the rotation matrix. To do so, it is mathematically convenient to use Equation (4) shown below.

$$x = [\alpha_1 \ldots \alpha_n s \; t^T]^T. \tag{4}$$

The gradient evaluated at the optimal x* must satisfy the following constraint: $\nabla_x J'|_{x=x^*}=0$. From this constraint, the relationship shown in Equation (5) shown below is defined as $$x = (A^T A + P)^{-1} A^T W b + (A^T A + P)^{-1} P x_0 = \begin{bmatrix} U \\ S \\ V \end{bmatrix} Wb + \lambda_s s_o l, \tag{5}$$

where $$A = \begin{bmatrix} r_1 & c_1 & -I \\ & \ddots & \vdots & \vdots \\ & & r_n c_n & -I \end{bmatrix}, b = \begin{bmatrix} p_1 \\ \vdots \\ p_n \end{bmatrix}, \tag{6}$$

$$P = \begin{bmatrix} 0_{n \times n} & & \\ & \lambda_s & \\ & & 0_{3 \times 3} \end{bmatrix}, W = \begin{bmatrix} R & & \\ & \ddots & \\ & & R \end{bmatrix}$$

and $$x_0 = [\; 0_n^T \; s_0 \; 0_3^T \;]^T.$$

$(A^T A+P)^{-1} A^T$ is partitioned into three matrices U, S, and V such that the depth, scale, and translation parameters are functions of U, S, and V, respectively. These matrices and the vector 1 can be computed in closed form by exploiting the sparse structure of the matrices A and P.

Equation (5) provides a linear relationship between the depth, scale, and translation and the rotation matrix. Consequently, these parameters are computed as a function of the rotation matrix in Equation (7) shown below $$a_i(R) = u_i^T Wb + \lambda_s s_o l_i$$

$$s(R) = SWb + \lambda_s s_o l_n$$

$$t(R) = VWb + \lambda_s s_o l_t. \tag{7}$$

where $u_i^T$ is the i-th row of matrix U, $1_j$ is the j-th entry of the vector 1, and $1_t$ corresponds to the last three entries of the vector 1.

In order to re-write the regularized least-squares cost function (i.e., Equation (3)) as clearly as possible, Equation (8) is formulated as shown below.

$$e_i = a_i(R) r_i - (R p_i + t(R) - s(R) c_i) = n_i - k_i$$

$$n_i = u_i^T Wb r_i - R p_i - VWb + SWb c_i$$

$$k_i = \lambda_s s_0 (l_i r - l_t + l_{n+1} c_i). \tag{8}$$

The residual $e_i$ is divided into two terms: $\eta_i$, the residual part considering the unconstrained terms; and $k_i$ the residual part considering the scale-prior-related terms. Note again that when $\lambda_s=0$, $k_i$ becomes null and $e_i$ becomes the residual corresponding to the original cost function (i.e., Equation (1)).

Using the definitions from Equation (8) and the scale, depth, and translation relationships shown in Equation (7), the regularized least-squares cost function shown in Equation (3) can be re-written as Equation (9) shown below $$J' = J'_{gDLS} + J'_s + J'_g = vec(R)^T M vec(R) + 2d^T vec(R) + k, \tag{9}$$

where $$J'_{gDLS} = \sum_{i=1}^{n} e_i^T e_i = \sum_{i=1}^{n} n_i^T n_i + 2k_i^T n_i + k_i^T k_i = \tag{10}$$

$$vec(R)^T M_{gDLS} vec(R) + 2d_{gDLS}^T vec(R) + k_{gDLS}$$

$$J'_s = \lambda_s (s_0 - S(R))^2 = vec(R)^T M_{sS} vect(R) + 2d_s^T vec(R) + k_s$$

$$J'_g = \lambda_g \| g_Q \times R g_w \|^2 = ver(R)^T M_g vec(R)$$

$$M = M_{gDLS} + M_s + M_g$$

$$d = d_{gDLS} + d_s$$

$$k = k_{gDLS} + k_s.$$

The parameters of Equation (9) (i.e., $M_{gDLS}$, $M_s$, $M_g$, $d_{gDLS}$, $d_s$, $k_{gDLS}$, and $k_s$) can be computed in closed form and in O(n) time. Equation (9) generalizes the unconstrained quadratic function shown in Equation (1) when both scale and rotation priors are disabled, i.e., $\lambda_g=\lambda_s=0$, then J'(R)=J(R). Also, note that the weights $\lambda_g$ and $\lambda_s$ control the contribution of each of the priors independently. Such independent control allows the estimator 202 to flexibly adapt the cost function to many scenarios. For instance, these weights can be adjusted so that the cost function reflects the confidence of certain priors based on sensor noise, reduces the effect of noise present in the priors, and fully disables one or both of the priors from influencing the cost of the cost function.

Equations (4)-(8) may be used as a mechanism to rewrite the Equation (3) to only depend on a rotation matrix that is encoded in Equations (9) and (10). In particular, Equations (5)-(6) are used to compute depth, scale, and translation as a linear transformation of rotation.

Given that the prior-based pose-and-scale cost function (i.e., Equation (3)) depends only on the rotation matrix, R can be solved to minimize Equation (9). To achieve this step, the rotation matrix R can be represented using a quaternion $q=[q_1\ q_2\ q_3\ q_4]$. To compute all the minimizers of Equation (9), a polynomial system may be built so that it encodes the first-order optimality conditions and the unit-norm-quaternion constraint shown below in Equation (11):

$$\begin{cases} \frac{\partial J'}{\partial q_j} = 0, & \forall_j = 1, ..., 4 \\ q_j(q^T q - 1) = 0, & \forall_j = 1, ..., 4 \end{cases} \quad (11)$$

The polynomial system on q shown in Equation (11) encodes the unit-norm-quaternion constraint within Equation (12) shown below.

$$\frac{\partial (q^T q - 1)^2}{\partial q_j} = q_j(q^T q - 1) = 0, \forall_j. \quad (12)$$

Equation (12) yields efficient elimination templates and small action matrices, which delivers efficient polynomial solvers. The efficient polynomial solver adopted by the cost function leverages the rotation representation shown in Equation (13) shown below.

$$\text{vec}(R) = [q_1^2 q_2^2 q_3^2 q_4^2 q_1 q_2 q_1 q_3 q_1 q_4 q_2 q_3 q_2 q_4 q_3 q_4]^T. \quad (13)$$

Given this representation, the dimensions of the parameters of the regularized least-squares cost function shown in Equation (9) become $M \in R10 \times 10$, $d \in R10$, and $k \in R$.

The cost function efficiently yields eight rotations after solving the polynomial system stated in Equation (11). After computing these rotations, the estimator 202 discards quaternions with complex numbers whose imaginary part falls below a certain threshold, and then recovers the depth, scale, and translation using Equation (7). Finally, the estimator 202 uses the computed similarity transformations to discard solutions that map the input 3D points behind any camera. By solving for the rotation matrix using Equations (9) and (10), the pose and scale may be estimated in a more quick and accurate manner than using Equation (2), which does not include rotation and scale priors.

As discussed above, the scale prior parameter 210 and the rotation prior parameter 212 may be configured to influence the cost of the cost function. The estimator 202 may be configured to perform the calculation to optimize at least a rotation term and a translation term of the similarity transformation. The estimator 202 may be further configured to perform the calculation to optimize the scale and depth terms as well, in some examples.

In some examples, the estimator 202 may determine a solved similarity transformation upon calculating a cost for the cost function that is less than a threshold cost. The threshold cost may be set to any suitable cost to provide a suitably accurate estimation of scale and pose in a suitably quick timeframe. In some examples, the threshold cost may correspond to a minimized cost calculated for the cost function as discussed above.

Further, the estimator 202 may be configured to output the estimated scale and pose 220 of the camera system 204 based on the solved similarity transformation. The similarity transformation may include one or more rigid transformations (e.g., rotation, translation) followed by a dilation (e.g., reduce/enlarge by a scale factor). Such a similarity transformation (and/or corresponding output of the estimator 202) may be used to align two or more reconstructions of a 3D model of a scene (e.g., 3D point cloud) computed with different sensors, or to localize a rig of cameras within an existing 3D reconstruction, among other scenarios. The estimator 202 may be configured to output the pose and scale estimations 220 to any suitable processing logic of the camera system 204, the computing system 200, and/or any other suitable device.

In some implementations, the computing system 200 may include both the estimator 202 and the camera system 204 incorporated into a same device. For example, the estimator and the camera system may be incorporated into an augmented reality device worn by a user. In another example, the estimator and the camera system may be incorporated into a robotic device configured for autonomous movement. In other implementations, the camera system 204 may be incorporated into a different device than the estimator 202. For example, the computing system 200 may be remote from the computing system 204 and connected via a computer network. In some examples, the estimator 202 may be implemented by a service computing system that is configured to receive the scale and rotation priors and camera data from the camera system, and return the pose and scale estimations to the camera system or an associated computing device. In some examples, the service may be a hologram sharing service for augmented reality devices. The hologram sharing service may maintain a reference map, and a client camera system may send input data to the hologram sharing service such that the hologram sharing service can use the input data to localize queried images with the reference map. The hologram sharing service may send the calculated pose and scale estimations back to the client camera system so that holograms can be positioned correctly on an augmented reality display associated with the client camera system in a quick and accurate manner.

Figure 4:
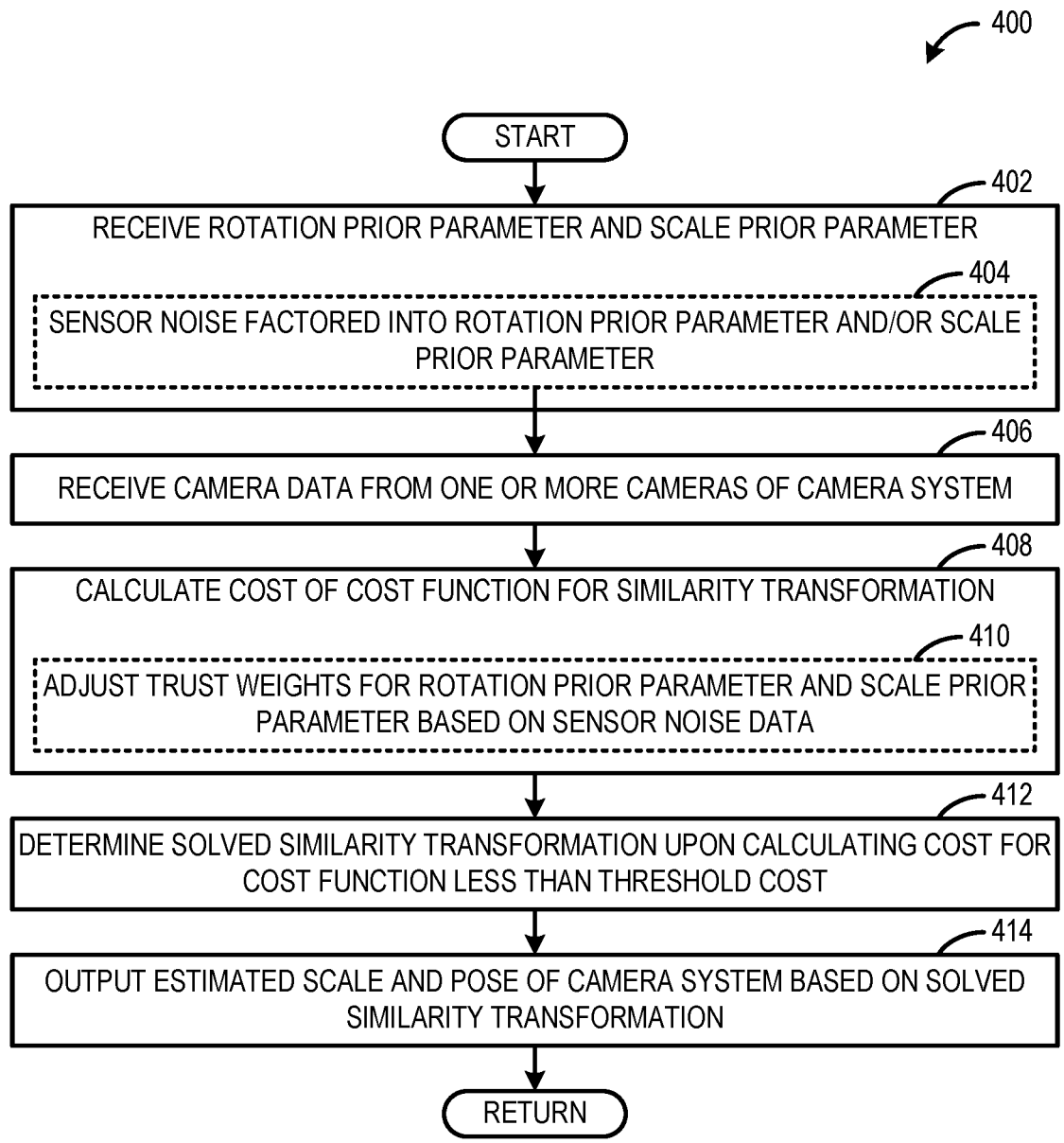
FIG. 4 is a flowchart of an example method for estimating pose and scale for a camera system.

FIG. 4 shows an example method 400 for estimating pose and scale of a camera system including one or more cameras. For example, the method 400 may be performed by the estimator 202 shown in FIG. 2. At 402, rotation and scale prior parameters are received. The rotation prior parameter characterizes a gravity direction. The scale prior parameter may characterize scale, depth, and/or translation of the camera system. In some examples, the rotation prior parameter and the scale prior parameter are derived from measurements of one or more inertial sensors of the camera system or an associated computing device.

In some implementations where the estimator is configured to dynamically adjust the contribution of the rotation and scale prior parameters based on sensor noise of one or more inertial sensors, at 404, sensor noise data optionally may be factored into the scale prior parameter and/or the rotation prior parameter. At 406, camera data for a scene is received from the one or more cameras of the camera system. In some examples, the camera data may include a collection of three-dimensional (3D) points of a 3D model of the scene. In some examples, the camera data may include whole or partial image frames of the scene that are optionally processed to form a 3D point cloud of the scene.

In some examples, the camera system may include a plurality of different cameras having different positions fixed relative to each other and the camera data may correspond to each of the different cameras. In other examples, the camera system may include a single camera movable throughout the scene and the camera data may correspond to the single camera at different positions within the scene.

At 408, a cost of a cost function for a similarity transformation that is configured to encode a scale and pose of the camera system is calculated. In one example, the cost may be calculated using Equations (9) and (10) shown described above. Such calculations may be performed to optimize a rotation term and a translation term of the similarity transformation. Further, the cost function includes the rotation prior parameter and the scale prior parameter such that the cost of the cost function is selectively influenced by the rotation prior parameter and the scale prior parameter. In some examples, the rotation prior parameter and the scale prior parameter selectively influence the cost of the cost function by selectively imposing a penalty on the cost of the cost function based on queried input data differing from prior data.

In some implementations, the cost function may include a rotation weight corresponding to the rotation prior parameter and a scale weight corresponding to the scale prior parameter. In such implementations, at 410, optionally the rotation weight and the scale weight may be dynamically adjusted based on sensor noise data factored into the scale prior parameter and/or the rotation prior parameter. As an example, the rotation weight and the scale weight may be dynamically decreased as sensor noise increases such that the corresponding rotation prior parameter and the corresponding scale prior parameter have less influence on the cost function as sensor noise increases. As another example, the rotation weight and the scale weight may be dynamically increased as sensor noise decreases such that the corresponding rotation prior parameter and the corresponding scale prior parameter have more influence on the cost function as sensor noise decreases. In some examples, either or both of the rotation weight and the scale weight may be dynamically set to zero based on sensor noise being greater than a threshold noise level such that the corresponding rotation prior parameter and the corresponding scale prior parameter have no influence on the cost function.

At 412, a solved similarity transformation is determined upon calculating a cost for the cost function that is less than a threshold cost. The threshold cost may be set to any suitable cost. In some examples, the threshold cost is a minimized cost for the cost function. At 414, an estimated scale and pose of the camera system is output based on the solved similarity transformation. The method 400 may be performed for each camera (i) of a plurality of cameras of a multi-camera system (or a single moving camera).

The herein described pose and scale estimation method can be broadly applicable to a variety of multi-camera or moving camera applications, such as in augmented reality and robotics applications. For instance, when trying to align a 3D reconstruction A (e.g., computed via a structure-from-motion algorithm) and a reconstruction B (e.g., computed with a SLAM system), the pose and scale method approach can be used to estimate a transformation that can align both reconstructions exploiting sensor information. This alignment reveals pose and scale information that enables accurate AR renderings and/or to localize precisely the position and orientation of a mobile device within an environment. The rotation and scale prior parameters provided by external sensors can be selectively used an input to quickly and accurately estimate pose and scale of a camera system. In some implementations, the contributions of these rotation and scale prior parameters can be selectively reduced or minimized based on the sensor noise of the sensor from which the prior parameters were obtained. In this way, the estimation method may be robust to noisy scale and gravity input data.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
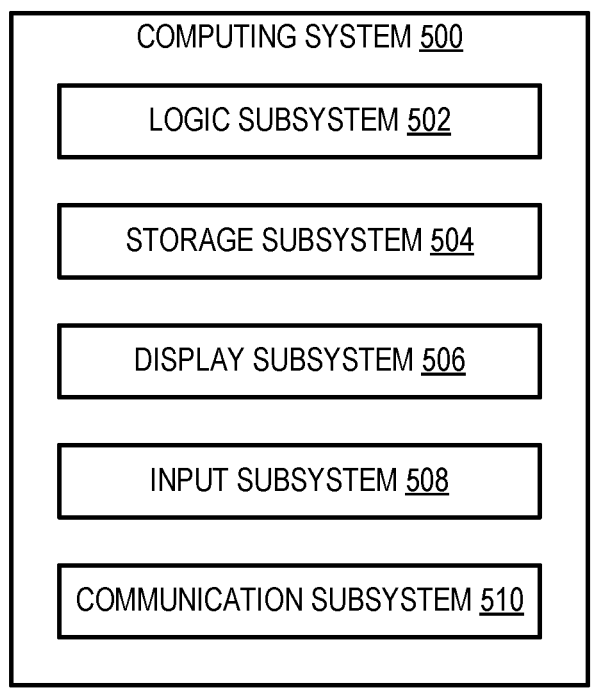
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, camera system, robotic device, autonomous vehicle, and/or other computing devices. For example, computing system 500 may take the form of computing system 200 and/or camera system 204 shown in FIG. 2.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

In an example, a scale and pose estimation method for a camera system comprises receiving camera data for a scene acquired by one or more cameras of the camera system, receiving a rotation prior parameter characterizing a gravity direction, receiving a scale prior parameter characterizing scale of the camera system, calculating a cost of a cost function for a similarity transformation that is configured to encode a scale and pose of the camera system, such calculation being performed to optimize a rotation term and a translation term of the similarity transformation, where the cost of the cost function is selectively influenced by the rotation prior parameter and the scale prior parameter, determining a solved similarity transformation upon calculating a cost for the cost function that is less than a threshold cost, and outputting an estimated scale and pose of the camera system based on the solved similarity transformation. In this example and/or other examples, the threshold cost may be a minimized cost for the cost function. In this example and/or other examples, the rotation prior parameter and the scale prior parameter may selectively influence the cost of the cost function by selectively imposing a penalty on the cost function. In this example and/or other examples, the rotation prior parameter and the scale prior parameter may be derived from measurements of one or more inertial sensors. In this example and/or other examples, the cost function may include a rotation weight corresponding to the rotation prior parameter and a scale weight corresponding to the scale prior parameter. In this example and/or other examples, the rotation weight and the scale weight may be adjusted based on sensor noise of the one or more inertial sensors. In this example and/or other examples, the rotation weight and the scale weight may decrease as sensor noise increases such that the corresponding rotation prior parameter and the corresponding scale prior parameter have less influence on the cost function as sensor noise increases, and the rotation weight and the scale weight may increase as sensor noise decreases such that the corresponding rotation prior parameter and the corresponding scale prior parameter have more influence on the cost function as sensor noise decreases. In this example and/or other examples, the rotation weight and the scale weight may be set to zero based on sensor noise being greater than a threshold noise level such that the corresponding rotation prior parameter and the corresponding scale prior parameter have no influence on the cost function. In this example and/or other examples, the camera data may include a collection of three-dimensional (3D) points of a 3D model of the scene. In this example and/or other examples, the camera system may include a plurality of different cameras having different positions fixed relative to each other. In this example and/or other examples, the camera system may include a single camera movable throughout the scene.

In an example, a computing system comprises one or more logic machines, one or more storage machines holding instructions executable by the one or more logic machines to receive camera data for a scene acquired by one or more cameras of a camera system, receive a rotation prior parameter characterizing a gravity direction, receive a scale prior parameter characterizing scale of the camera system, calculate a cost of a cost function for a similarity transformation that is configured to encode a scale and pose of the camera system, such calculation being performed to optimize a rotation term and a translation term of the similarity transformation, where the cost of the cost function is selectively influenced by the rotation prior parameter and the scale prior parameter, determine a solved similarity transformation upon calculating a cost for the cost function that is less than a threshold cost, and output an estimated scale and pose of the camera system based on the solved similarity transformation. In this example and/or other examples, the threshold cost may be a minimized cost for the cost function. In this example and/or other examples, the rotation prior parameter and the scale prior parameter selectively influence the cost of the cost function by selectively imposing a penalty on the cost of the cost function. In this example and/or other examples, the rotation prior parameter and the scale prior parameter are derived from measurements of one or more inertial sensors. In this example and/or other examples, the cost function may include a rotation weight corresponding to the rotation prior parameter and a scale weight corresponding to the scale prior parameter. In this example and/or other examples, the rotation weight and the scale weight may be adjusted based on sensor noise of the one or more inertial sensors. In this example and/or other examples, the rotation weight and the scale weight may decrease as sensor noise increases such that the corresponding rotation prior parameter and the corresponding scale prior parameter have less influence on the cost function as sensor noise increases, and the rotation weight and the scale weight may increase as sensor noise decreases such that the corresponding rotation prior parameter and the corresponding scale prior parameter have more influence on the cost function as sensor noise decreases. In this example and/or other examples, the rotation weight and the scale weight may be set to zero based on sensor noise being greater than a threshold noise level such that the corresponding rotation prior parameter and the corresponding scale prior parameter have no influence on the cost function.

In an example, a scale and pose estimation method for a camera system comprises receiving camera data for a scene acquired by one or more cameras of the camera system, receiving a rotation prior parameter characterizing a gravity direction, receiving a scale prior parameter characterizing scale of the camera system, wherein the rotation prior parameter and the scale prior parameter are derived from measurements of one or more inertial sensors, calculating a cost function for a similarity transformation that is configured to encode a scale and pose of the camera system, such calculation being performed to optimize a rotation term and a translation term of the similarity transformation, where the cost of the cost function is selectively influenced by the rotation prior parameter, a rotation weight corresponding to the rotation prior parameter, the scale prior parameter and a scale weight corresponding to the scale prior parameter, adjusting the rotation weight and the scale weight based on the sensor noise of the one or more inertial sensors, determining a solved similarity transformation upon calculating a cost for the cost function that is less than a threshold cost, and outputting an estimated scale and pose of the camera system based on the solved similarity transformation.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A scale and pose estimation method for a camera system, the method comprising:
   receiving camera data for a scene acquired by one or more cameras of the camera system;
   receiving a rotation prior parameter characterizing a gravity direction;
   receiving a scale prior parameter characterizing scale of the camera system;
   calculating a cost of a cost function for a similarity transformation that is configured to encode a scale and pose of the camera system, such calculation being performed to optimize a rotation term and a translation term of the similarity transformation, where the cost of the cost function is selectively influenced by the rotation prior parameter and the scale prior parameter;
   determining a solved similarity transformation upon calculating a cost for the cost function that is less than a threshold cost; and
   outputting an estimated scale and pose of the camera system based on the solved similarity transformation.

2. The method of claim 1, wherein the threshold cost is a minimized cost for the cost function.

3. The method of claim 1, wherein the rotation prior parameter and the scale prior parameter selectively influence the cost of the cost function by selectively imposing a penalty on the cost function.

4. The method of claim 1, wherein the rotation prior parameter and the scale prior parameter are derived from measurements of one or more inertial sensors.

5. The method of claim 4, wherein the cost function includes a rotation weight corresponding to the rotation prior parameter and a scale weight corresponding to the scale prior parameter.

6. The method of claim 5, wherein the rotation weight and the scale weight are adjusted based on sensor noise of the one or more inertial sensors.

7. The method of claim 6, wherein the rotation weight and the scale weight decrease as sensor noise increases such that the corresponding rotation prior parameter and the corresponding scale prior parameter have less influence on the cost function as sensor noise increases, and wherein the rotation weight and the scale weight increase as sensor noise decreases such that the corresponding rotation prior parameter and the corresponding scale prior parameter have more influence on the cost function as sensor noise decreases.

8. The method of claim 6, wherein the rotation weight and the scale weight are set to zero based on sensor noise being greater than a threshold noise level such that the corresponding rotation prior parameter and the corresponding scale prior parameter have no influence on the cost function.

9. The method of claim 1, wherein the camera data includes a collection of three-dimensional (3D) points of a 3D model of the scene.

10. The method of claim 1, wherein the camera system includes a plurality of different cameras having different positions fixed relative to each other.

11. The method of claim 1, wherein the camera system includes a single camera movable throughout the scene.

12. A computing system comprising:
one or more logic machines;
one or more storage machines holding instructions executable by the one or more logic machines to:
receive camera data for a scene acquired by one or more cameras of a camera system;
receive a rotation prior parameter characterizing a gravity direction;
receive a scale prior parameter characterizing scale of the camera system;
calculate a cost of a cost function for a similarity transformation that is configured to encode a scale and pose of the camera system, such calculation being performed to optimize a rotation term and a translation term of the similarity transformation, where the cost of the cost function is selectively influenced by the rotation prior parameter and the scale prior parameter;
determine a solved similarity transformation upon calculating a cost for the cost function that is less than a threshold cost; and
output an estimated scale and pose of the camera system based on the solved similarity transformation.

13. The computing system of claim 12, wherein the threshold cost is a minimized cost for the cost function.

14. The computing system of claim 12, wherein the rotation prior parameter and the scale prior parameter selectively influence the cost of the cost function by selectively imposing a penalty on the cost of the cost function.

15. The computing system of claim 12, wherein the rotation prior parameter and the scale prior parameter are derived from measurements of one or more inertial sensors.

16. The computing system of claim 15, wherein the cost function includes a rotation weight corresponding to the rotation prior parameter and a scale weight corresponding to the scale prior parameter.

17. The computing system of claim 16, wherein the rotation weight and the scale weight are adjusted based on sensor noise of the one or more inertial sensors.

18. The computing system of claim 17, wherein the rotation weight and the scale weight decrease as sensor noise increases such that the corresponding rotation prior parameter and the corresponding scale prior parameter have less influence on the cost function as sensor noise increases, and wherein the rotation weight and the scale weight increase as sensor noise decreases such that the corresponding rotation prior parameter and the corresponding scale prior parameter have more influence on the cost function as sensor noise decreases.

19. The computing system of claim 17, wherein the rotation weight and the scale weight are set to zero based on sensor noise being greater than a threshold noise level such that the corresponding rotation prior parameter and the corresponding scale prior parameter have no influence on the cost function.

20. A scale and pose estimation method for a camera system, the method comprising:
receiving camera data for a scene acquired by one or more cameras of the camera system;
receiving a rotation prior parameter characterizing a gravity direction;
receiving a scale prior parameter characterizing scale of the camera system, wherein the rotation prior parameter and the scale prior parameter are derived from measurements of one or more inertial sensors;
calculating a cost function for a similarity transformation that is configured to encode a scale and pose of the camera system, such calculation being performed to optimize a rotation term and a translation term of the similarity transformation, where the cost of the cost function is selectively influenced by the rotation prior parameter, a rotation weight corresponding to the rotation prior parameter, the scale prior parameter and a scale weight corresponding to the scale prior parameter;
adjusting the rotation weight and the scale weight based on the sensor noise of the one or more inertial sensors;
determining a solved similarity transformation upon calculating a cost for the cost function that is less than a threshold cost; and
outputting an estimated scale and pose of the camera system based on the solved similarity transformation.

* * * * *